United States Patent [19]

Schwarz

[11] Patent Number: 4,981,360

[45] Date of Patent: Jan. 1, 1991

[54] APPARATUS AND METHOD FOR PROJECTION MOIRE MAPPING

[75] Inventor: Robert C. Schwarz, Dix Hills, N.Y.

[73] Assignee: Grumman Aerospace Corporation, Bethpage, N.Y.

[21] Appl. No.: 349,721

[22] Filed: May 10, 1989

[51] Int. Cl.[5] ............................................. G01B 11/24
[52] U.S. Cl. ........................................ 356/376; 356/32
[58] Field of Search ........................... 356/32, 374, 376

[56] References Cited

U.S. PATENT DOCUMENTS

| | | | |
|---|---|---|---|
| 3,185,022 | 5/1965 | Holeman | 356/243 |
| 3,604,813 | 9/1971 | Kronnie | 356/374 |
| 3,614,237 | 10/1971 | Kyle | 356/376 |
| 3,619,064 | 11/1971 | Brooks | 356/376 |
| 3,627,427 | 12/1971 | Johnson | 356/356 |
| 3,664,739 | 5/1972 | Pryor | 356/357 |
| 3,762,818 | 10/1973 | Johnson et al. | 356/357 |
| 3,767,308 | 10/1973 | Duffy | 356/359 |
| 3,833,303 | 9/1974 | Burns et al. | 356/395 |
| 3,858,981 | 1/1975 | Jaerisch et al. | 356/355 |
| 4,025,197 | 5/1977 | Thompson | 356/356 |
| 4,079,252 | 3/1978 | Brake | 250/237.6 |
| 4,102,578 | 7/1978 | Suzuki et al. | 356/374 |
| 4,125,025 | 11/1978 | Suzuki et al. | 356/374 |
| 4,202,630 | 5/1980 | Suzuki et al. | 356/376 |
| 4,349,277 | 9/1982 | Mundy et al. | 356/376 |
| 4,443,705 | 4/1984 | DiMatteo et al. | 356/376 |
| 4,452,534 | 6/1984 | Gribanov et al. | 356/376 |
| 4,459,027 | 7/1984 | Kafri et al. | 356/376 |
| 4,480,919 | 11/1984 | Asano et al. | 356/376 |
| 4,564,295 | 1/1986 | Halioua | 356/376 |
| 4,600,304 | 7/1986 | Kafri et al. | 356/138 |

OTHER PUBLICATIONS

Direct Determination of Flexoral Strains in Plate using Projected Gratings, Liang et al.; pp. 401-405 International Conference on Experimental Stress Analysis; Munich, Germany pp. 18-22; Sep. 1978.
Determination of Out-of-Phase Displacements and the Initiation of Buckling in Composite Structural Elements, pp. 664-672; Schwartz; Society for Experimental Mechanics, Jun. 1987.
Horsch et al., "A Moire Fringe Data Handling System for Application in an Industrial Laboratory", VDI-Berichte Nr. 313, Sep. 1978; pp. 135-141—Proceedings from the 6th International Conference of Experimental/Stress Analysis; Munich, Germany.

Primary Examiner—F. L. Evans
Assistant Examiner—K. P. Hantis
Attorney, Agent, or Firm—Pollock, VandeSande & Priddy

[57] ABSTRACT

Photographic mapping of structural surfaces is accomplished by a projection Moire method. Deformations of the structure surface being investigated are zeroed out when under no load. This is accomplished by projecting a master grille pattern onto a test surface. The reflection then exposes a photographic plate. After the photographic plate is developed, it is repositioned in its original position and the distorted image thereon is projected back to the structure surface being investigated. It is then viewed from behind the master grille. By reprojecting the distorted image against the structure surface, the distortions on the photographic plate become reversed so that they appear at the recording station in coincidence with the master grille. Thus, any minor deformations of the structure surface produce no fringes at an observation point. As loading of the structure proceeds, the fringes will develop in proportion to buckling of the structure.

5 Claims, 2 Drawing Sheets

APPARATUS AND METHOD FOR PROJECTION MOIRE MAPPING

BACKGROUND OF THE INVENTION

In a number of industries, it is important to determine and map out-of-plane displacements of structural panels during loading. This is particularly important in the aerospace industry where it is important to determine displacements of load-sensitive structures such as composite panels.

Traditionally, the methods used to predict buckling failures of composite structures have been largely empirical. The predictions were based on finite element analysis and a large number of failing load tests performed on stiffened shear panels, compression panels, and beams in universal test machines. The tests provide very little information on the deformation of the structures as a function of applied load magnitude. Analysts and designers have virtually no test correlation of any parameter except failing load.

The prior art has suggested the utilization of the projection Moire mapping technique for determining out-of-plane displacements of structural surfaces. Typically, this is done by projecting a line ruling on the surface of the structure to be examined. The surface should have a color and texture which permits the line ruling to be imaged on it. Ideally, the surface should be painted with flat white paint. The image of the ruling is viewed by a lens of a recording station and imaged on another ruling located at a recording station image plane. If the image of the projected grille on the recording station image plane and the recording station master grille have different pitches, Moire fringes are produced. If they are of the same pitch, no fringes will be produced at the recording station. In the latter situation as a test surface is deformed away from its initial position, Moire fringes proportional to out-of-plane displacement will be created at the recording station image plane. The resulting recorded image will be a contour map of the deformed surface and sequential photographs may be taken at the recording station image plane as the load is varied on the structural member being observed. The information derived from the resulting maps are useful in analyzing the effects of load, particularly shear loads which tend to cause buckling in composite structural elements.

BRIEF DESCRIPTION OF THE INVENTION

If relatively large structural panels are to be investigated by the projection Moire method, it is necessary to have two optically precisely fabricated grilles. The pitch of the master grille and the projected grille must be such that it will have the same pitch, on the recording station image plane, for an observed surface which is undeformed. The problem with this approach is that it is quite costly to fabricate an optically precise large projection grille; and more importantly, as a practical matter most structural surfaces are not truly planar (undeformed over the entire surface).

The present invention offers two distinct advantages over the prior art. Initially, the projection grille is formed by photographing a reflected master grille image on the structural surface being observed. This is an economical means for producing a projection grille. However, since the surface undergoing inspection will have an initial deformity, the developed projection grille will not have truly parallel lines, as is the case with the master grille. Rather, the grille will be distorted depending upon the unloaded minor deformation of the structural surface. The present invention cleverly takes advantage of this fact since, notwithstanding the non-perfect planar structural surface, the deformed projection grille lines will be re-reflected from the structural surface with a reversal of the distortion so that it appears at the recording station image plane with precise parallel grille rulings. Accordingly, the result is a "zeroing out" of the small irregularities and deviations from flatness in the test surface. This is a distinct advantage of the present invention since it is possible, even if the surface is not a perfect plane, to start with a field without any residual fringes.

BRIEF DESCRIPTION OF FIGURES

The above-mentioned objects and advantages of the present invention will be more clearly understood when considered in conjunction with the accompanying drawings, in which.

DETAILED DESCRIPTION OF THE INVENTION

Figure 1:
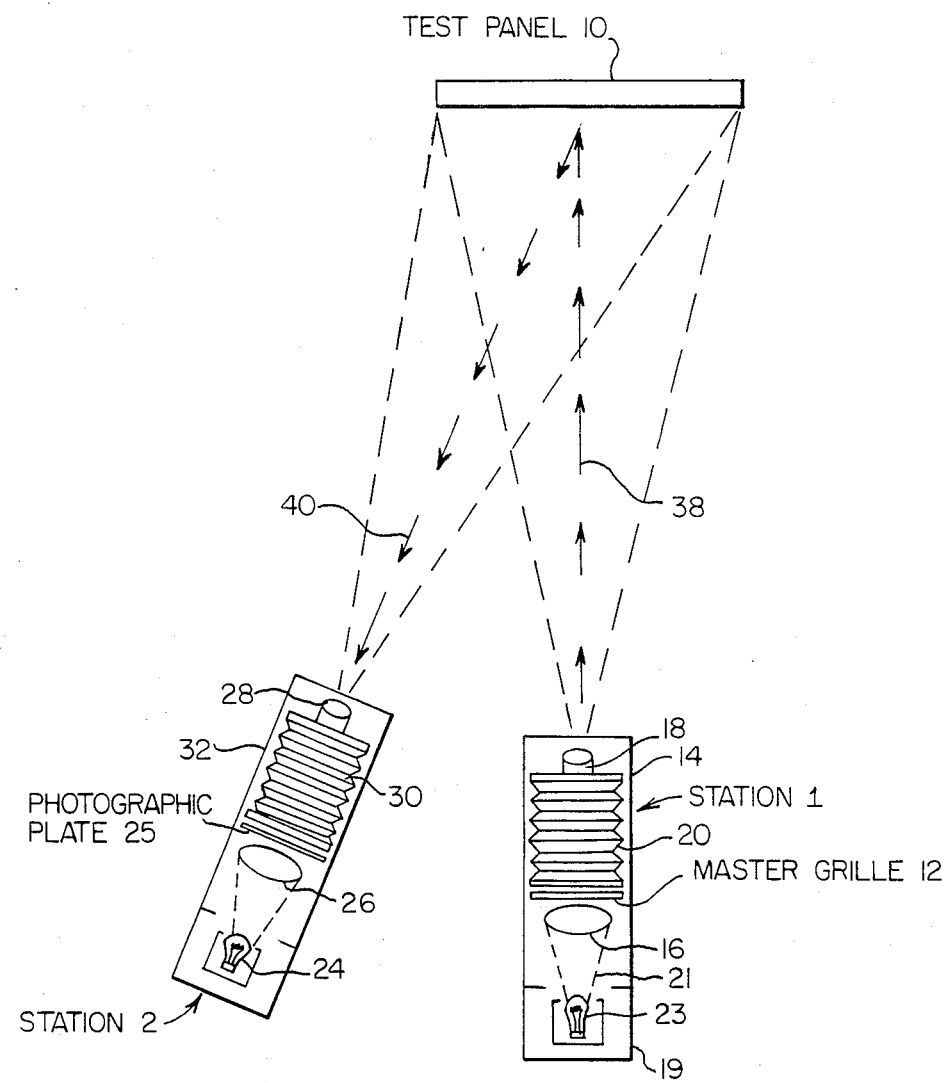
FIG. 1 is a schematic illustration of apparatus employed in the present invention for preparing a projection grille from a master grille.

FIG. 1 illustrates the basic structure of the present invention for achieving Moire projections. With the apparatus as set up in FIG. 1, a photographic plate is exposed to the reflection of a master grille pattern from a test panel so as to form a projection grille, as will be explained hereinafter.

A test panel 10 is indicated in the figure. It is preferable that the reflection surface be of an appropriate texture and color to maximize reflectance. In a preferred embodiment of the present invention, the reflective surface of the test panel is painted flat white. Two optical stations, denoted Station 1 and Station 2, are illustrated as being spaced from the reflective surface of test panel 10. With prior art methods Station 1 would ordinarily be a recording station while Station 2 would be a projection station. However, in accordance with the present invention, Station 1 and Station 2 each serve both purposes, as will be presently explained.

At Station 1 a master grille 12 is located and comprises a high quality, 500 lines-per-inch ruling, oriented with the lines vertical. The grille is located within a housing 14 and a white light removable lamp source unit 19 shines light through an adjustable lens mechanism, such as a bellows 20. At the outlet of the bellows is a lens 18 which may be of the high quality process lens type known as a Schneider-Kreuznack Componons lens with a 300 mm focal length. The light source unit 19 includes an element 23 which directs a beam of light 21 toward a light collimator 16.

During a first stage of operation for the present invention, light shining through the master grille is directed, as indicated by reference numeral 38, toward the reflecting surface of test panel 10. Due to normal deformations of the test panel surface, the master grille pattern image, indicated by reference numeral 40, is directed toward Station 2 which includes photographic plate 25 positioned within housing 32. After passing through lens 28 and bellows 30, similar to parts 18 and 20 of Station 1, the reflected master grille image is focused upon the photographic plate 25. The photographic plate will be exposed to a distorted reflection of the master grille pattern due to the minor irregularities of the normally deformed surface of a test panel 10.

After the photographic plate 25 has been adequately exposed, it is developed. The distorted master grille image then forms a distorted grille pattern which serves as a projection grille 27 in FIG. 2.

Figure 2:
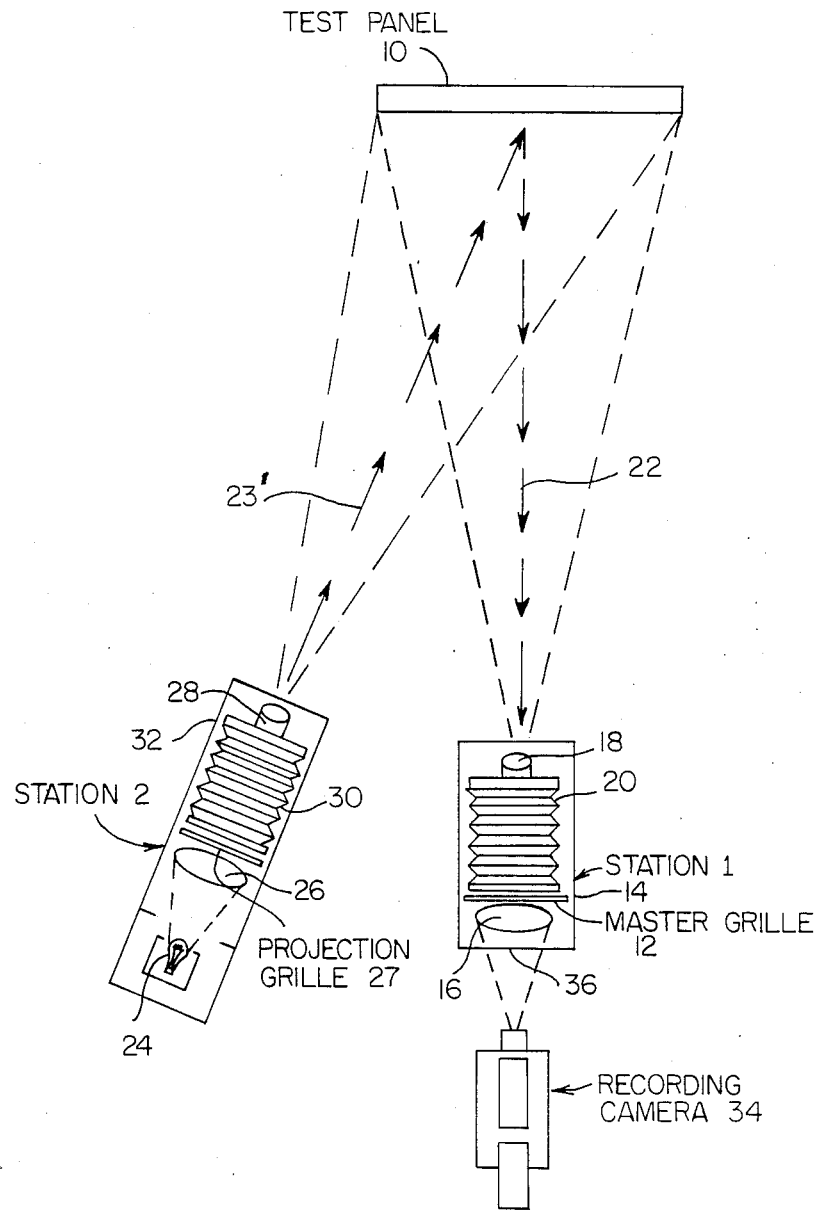
FIG. 2 is a schematic view similar to FIG. 1 wherein Moire projections may be recorded.

FIG. 2 illustrates the apparatus of the present invention during a second phase of operation, namely the recording of fringes. The developed photographic plate 25 (FIG. 1) is now the projection grille 27 in FIG. 2 and is precisely positioned back in its original position so that each of the distorted lines which exposed the photographic plate 25 is in the same position on the projection grille 27. In FIG. 2 the light source unit 19 is removed from Station 1 and becomes attached to Station 2 as indicated at 24 so that the pattern from projection grille 27 may be projected back to the reflecting surface (23') of test panel 10 and from there to Station 1 (22) then finally (36) recorded by recording camera 34, as will be explained shortly. A collimator lens 26 is positioned between the light source unit and the projection grille 27.

In one experimental set-up for the present invention, both stations were set 129 inches from the center of the test surface. Station 2 was set so that there was a 22° included angle formed by the optic axes of the two stations. This combination produced approximately a 10:1 magnification of the 500 lines per square inch master grille, resulting in a grille pattern on the test surface with a density of approximately 50 lines per inch. The combination of a projected grille pattern with a pitch of 0.020 inch and an included angle of 22° was chosen to produce a sensitivity of approximately 0.050 inch of displacement per fringe.

When the developed photographic plate, now serving as projection grille 27 is illuminated, an exact replica of the distorted master grille image is projected back to the test panel 10. If all optics have been restrained to preclude relative movement of the test panel 10, the distortion will be reflected from the test panel as a mirror image, thereby received at Station 1 as a non-distorted grille image, completely coincident with the master grille 12. The result will be the zeroing out of small irregularities and deviations from flatness in the test panel surface. Otherwise stated, although irregularities exist in the test panel at an initial point, a recording camera 34 will record no fringes from the projected grille 27. As the test panel 10 is loaded from this point on during testing, fringes will develop relative to the initial zeroed-out calibrated condition. The result of this procedure is to cancel the effects of out-of-plane displacement of a test panel when tests or inspections begin with a non-loaded condition.

When setting up the apparatus of the present invention, in order to minimize distortion in the image from the test article, the optic axis of Station 1 is set perpendicular to the test surface. Optical distortion is minimized by ensuring that the vertical axis of the projection grille is normal to the optic axis of Station 2. Also, a number of optical lines should all lay in a single plane, namely the normal to the surface to be measured, the optic axis of Station 2, and the optic axis of Station 1. It is also desirable that the optic axis of the recording camera 34 be normal to the test surface 10 and pass through its geometric center. This is achieved by using an aligning laser (not shown) mounted on the recording camera and a mirror placed on the test panel 10. The recording camera 34 is then moved until the laser beam is reflected back on itself and the desired spacing between the recording camera 34 and the test surface is obtained.

With the zeroing-out of a non-loaded test panel, a test may now proceed wherein load is applied. As the test surface deforms, the pitch of the projected grille on the surface changes following the laws of geometric optics. Equally, the image of the changed projected grille at the recording camera image plane is changed by lens 18. Thus, as the test surface deflects away from its initial position under load, Moire fringes proportional to out-of-plane displacement are created at the image plane of camera 34. These fringes are then recorded by the camera for later use in accordance with analysis techniques well known by those of ordinary skill in the art.

It should be understood that the invention is not limited to the exact details of construction shown and described herein for obvious modifications will occur to persons skilled in the art.

I claim:

1. A method for creating projection Moire images comprising of steps:
   reflecting the lines of a master grille from the normally non-planar surface of an unloaded structural member;
   directing the reflected lines onto a photographic plate positioned at a fixed location;
   removing the plate;
   developing the resulting reflected lines present on the plate and distorted by the non-planar surface of the plate;
   repositioning the developed plate in the fixed location
   projecting light through the developed plate for reflection of the distorted lines from the non-planar surface causing a reversal of the line distortions to resemble the lines of the master grille and thereby offsetting the effect of the unloaded non-planar surface;
   recording fringe patterns behind the master grille as light is projected through the developed plate and load is applied to the structural member.

2. A projection Moire apparatus for offsetting non-planar curvature of a structural unloaded member surface comprising:
   a master grille having a line pattern thereon;
   means for projecting the master grille line pattern toward the structural member surface which distorts the projected line pattern upon reflection therefrom;
   a photographic plate positioned at a fixed location in line with reflected pattern for exposure, removal and development of the distorted line pattern thereon;
   means for projecting light through the developed plate positioned at a fixed location for reflection from the structural member surface causing a reversal of distorted lines to a form identical with the lines of the master grille so that there is uniform interference between the grille lines and the reflected photographic plate lines thus offsetting the unloaded curvature of the structure surface; and
   means located behind the master grille for recording Moire fringe images as the structure is loaded and the non-planar curvature commensurately undergoes change.

3. The structure set forth in claim 2 wherein the master grille and photographic plate are each located within respective housings; and
 further wherein each housing has a rear opening for selectably securing a light source thereto for projecting light therefrom in a selected direction toward the structure member surface.

4. The structure set forth in claim 2 together with adjustable lens means located between the master grille and the structure member surface for focusing a grille image on the surface.

5. The structure set forth in claim 2 together with adjustable lens means located between the photographic plate and the structure member surface for focusing a developed plate grille image on the surface.

UNITED STATES PATENT AND TRADEMARK OFFICE
CERTIFICATE OF CORRECTION

PATENT NO. : 4,981,360

DATED : January 1, 1991

INVENTOR(S) : Robert C. Schwarz

It is certified that error appears in the above-identified patent and that said Letters Patent is hereby corrected as shown below:

Column 4, line 23, change "of" to --the--.

Column 4, line 33, after "location" insert --;--.

Signed and Sealed this

Twenty-eighth Day of April, 1992

Attest:

HARRY F. MANBECK, JR.

*Attesting Officer*  *Commissioner of Patents and Trademarks*